US012369182B2

(12) United States Patent
Luo et al.

(10) Patent No.: US 12,369,182 B2
(45) Date of Patent: Jul. 22, 2025

(54) SYSTEM AND METHOD FOR REFERENCE SIGNALING DESIGN AND CONFIGURATION

(71) Applicant: ZTE CORPORATION, Guangdong (CN)

(72) Inventors: Wei Luo, Shenzhen (CN); Boyuan Zhang, Shenzhen (CN); Lin Chen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 133 days.

(21) Appl. No.: 17/737,786

(22) Filed: May 5, 2022

(65) Prior Publication Data
US 2023/0056864 A1 Feb. 23, 2023

Related U.S. Application Data

(63) Continuation of application No. PCT/CN2019/116316, filed on Nov. 7, 2019.

(51) Int. Cl.
*H04W 72/566* (2023.01)

(52) U.S. Cl.
CPC ................. *H04W 72/569* (2023.01)

(58) Field of Classification Search
CPC ............ H04W 72/21; H04W 28/0278; H04W 72/543; H04W 72/56; H04W 72/20; H04W 72/569; H04W 28/24; H04W 28/16; H04W 72/02; H04W 28/0289; H04W 28/0284; H04W 92/18; H04W 4/46; H04W 4/44; H04W 28/0268; H04W 68/005; H04W 8/08; H04W 76/27; H04W 48/16; H04W 60/00; H04W 8/18; H04W 74/0816; H04W 4/40; H04W 4/08; H04W 72/04;
(Continued)

(56) References Cited

U.S. PATENT DOCUMENTS 11,452,078 B2 * 9/2022 Cao ..................... H04W 4/46
2018/0176937 A1 6/2018 Chen et al.
(Continued)

FOREIGN PATENT DOCUMENTS

CN 108811157 A 11/2018
CN 109565791 A 4/2019
(Continued)

OTHER PUBLICATIONS

ETSI MCC, "Report of 3GPP TSG RAN2#109-e meeting, Online", 3GPP TSG-RAN WG2 meeting #109bis-e, R2-2002501, Mar. 6, 2020, Online (370 pages).
(Continued)

Primary Examiner — David Q Nguyen
(74) Attorney, Agent, or Firm — Foley & Lardner LLP

(57) ABSTRACT

A system and method for reference signaling design and configuration are disclosed herein. In one embodiment, the system and method are configured to receive, by a first wireless communication device from a wireless communication node, configuration information of a sidelink medium access control (MAC) control element (CE). The system and method are also configured to transmit, by the first wireless communication device according to the configuration information, the sidelink MAC CE to a second wireless communication device.

12 Claims, 8 Drawing Sheets

(58) Field of Classification Search
CPC .............. H04W 52/383; H04W 52/242; H04W 52/245; H04L 69/161; H04L 47/24; H04L 5/0053; H04L 5/0033; H04L 1/0003; H04L 5/0091; H04L 5/0044; H04L 1/0023; H04L 5/0048; H04B 17/318; H04B 17/382
USPC ................................. 370/328, 329, 330, 331
See application file for complete search history.

(56) References Cited

U.S. PATENT DOCUMENTS

| | | | | |
|---|---|---|---|---|
| 2018/0317123 | A1* | 11/2018 | Chen | H04W 72/21 |
| 2018/0324882 | A1 | 11/2018 | Gulati et al. | |
| 2019/0182896 | A1 | 6/2019 | Shrestha et al. | |
| 2019/0215685 | A1 | 7/2019 | Wang et al. | |
| 2020/0053704 | A1* | 2/2020 | Kim | H04W 74/006 |
| 2020/0351833 | A1* | 11/2020 | Chae | H04W 72/04 |
| 2021/0274545 | A1* | 9/2021 | Adjakple | H04W 28/0268 |
| 2022/0078839 | A1* | 3/2022 | Yoshioka | H04W 40/22 |

FOREIGN PATENT DOCUMENTS

| | | |
|---|---|---|
| CN | 110225599 A | 9/2019 |
| EP | 3 512 276 A1 | 7/2019 |
| WO | WO-2018/080565 A1 | 5/2018 |
| WO | WO-2019/022468 A1 | 1/2019 |

OTHER PUBLICATIONS

Office Action for EP Appl. No. 19952092.5, dated Feb. 29, 2024 (9 pages).
RAN1, "LS on signalling of sidelink RSRP and CSI between UEs", 3GPP TSG RAN WG1 #98bis, R1-1911698, Oct. 20, 2019, Chongqing, China (2 pages).
ZTE Corporation et al., "Consideration on model resource allocation", 3GPP TSG RAN WG2 Meeting #107bis, R2-1912379, Oct. 18, 2019, Chongqing, China (8 pages).
Ericsson: "On support of SL CSI report", 3GPP TSG-RAN WG2 Meeting #107, TDoc R2-1910297, Prague, Czech, Aug. 15, 2019 (2 pages).
Extended European Search Report on EP Appln. No. 19 952 092.5, dated Apr. 3, 2023 (11 pages).
QUALCOMM Incorporated: "Physical Layer Procedures for Sidelink", 3GPP Draft; 3GPP TSG RAN WG1 Meeting #98bis, RI-1911110, Chongqing, China, Oct. 8, 2019 (8 pages).
Ericsson, "Discussion on NR SL lower layer procedures", 3GPP TSG-RAN WG2 #107bis, R2-1913330, Oct. 18, 2019, Chongqing, China (6 pages).
Second Office Action for JP Appl. No. 2022-526149, dated Dec. 19, 2023 (with English translation, 4 pages).
First Japanese Office Action on JP Appl No. 2022-526149, dated Aug. 16, 2023 (5 pages, including English translation).
Huawei, et al., "Sidelink physical layer procedures for NR V2X," 3GPP TSG RAN WG1, Meeting #98bis, R1-1910059, Chongqing, China, Oct. 8, 2019 (24 pages).
CATT: "Leftover Issues for NR Sidelink Configured Grant" 3GPP TSG-RAN WG2 Meeting #107, R2-1908744; Aug. 16, 2019(Aug. 16, 2019).
Huawei et al.: "Miscellaneous corrections for V2V in Ts 36.321" 3GPP TSG-RAN WG2 Meeting #96, R2-167733 Dec. 2, 2016(Dec. 2, 2016).
International Search Report and Written Opinion for PCT Appl. No. PCT/CN2019/116316 mailed Jul. 28, 2020 (with English translation, 11 pages).
First Office Action for CN Appl. No. 201980102030.4, dated Oct. 30, 2024 (with English translation, 14 pages).
Lenovo et al., "SR trigger for NR SL", 3GPP TSG-RAN WG2 Meeting #07bis, R2-1912687, Oct. 18, 2019, Chongqing, China (3 pages).
Second Office Action for CN Appl. No. 201980102030.4, dated Mar. 6, 2025 (with English translation, 20 pages).

* cited by examiner

200 receiving, by a first wireless communication device from a wireless communication node, configuration information of a sidelink medium access control (MAC) control element (CE)
202 transmitting, by the first wireless communication device according to the configuration information, the sidelink MAC CE to a second wireless communication device
204

300

```
receiving, by a wireless communication
device from a wireless communication node,
configuration information of an uplink medium
access control (MAC) control element (CE)
302
```

```
transmitting, by the wireless communication
device according to the configuration
information, the uplink MAC CE to the
wireless communication node
304
```

400

402
determining, by a first sidelink wireless communication device, either to transmit a medium access control (MAC) service data unit (SDU) for a specific sidelink logical channel to a second sidelink wireless communication device or to receive the MAC SDU for the specific sidelink logical channel from the second sidelink wireless communication device

404
starting or restarting, by the first sidelink wireless communication device, a timer in response to the determination

> randomly selecting, by the first sidelink wireless communication device from a resource pool, a sub-channel as the resource in a frequency-domain
> 502

> selecting, by the first sidelink wireless communication device, a time slot, which is X slots prior to the sidelink grant, as the resource in a time-domain, wherein X is configured by a wireless communication node in a layer higher than a MAC layer
> 504

FIG. 5

600
randomly selecting, by the first sidelink wireless communication device from a resource pool, a sub-channel as the resource in a frequency-domain
602
selecting, by the first sidelink wireless communication device, a time slot, which is X slots prior to the sidelink grant, as the resource in a time-domain, wherein X is configured in a layer higher than a MAC layer
604
FIG. 6

700 

determining, by a first sidelink wireless communication device, that a sidelink grant has been configured for transmitting a medium access control (MAC) protocol data unit (PDU)
702

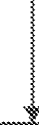

reserving, by the first sidelink wireless communication device based on the MAC PDU, a resource to transmit a stand-alone sidelink control information (SCI) to a second sidelink wireless communication device
704

FIG. 7

SYSTEM AND METHOD FOR REFERENCE SIGNALING DESIGN AND CONFIGURATION

CROSS-REFERENCE TO RELATED APPLICATION

This application claims the benefit of priority under 35 U.S.C. § 120 as a continuation of PCT Patent Application No. PCT/CN2019/116316, filed on Nov. 7, 2019, the disclosure of which is incorporated herein by reference in its entirety.

TECHNICAL FIELD

The disclosure relates generally to wireless communications and, more particularly, to systems and methods for reference signaling design and configuration.

BACKGROUND

Sidelink (SL) communication is a wireless radio communication directly between two or more user equipment devices (hereinafter "UE"). In this type of communication, two or more UEs that are geographically proximate to each other can directly communicate without going through an eNode or a base station (hereinafter "BS"), or a core network. Data transmission in sidelink communications is thus different from typical cellular network communications, which transmit data to a BS (i.e., uplink transmissions) or receive date from a BS (i.e., downlink transmissions). In sidelink communications, data is transmitted directly from a source UE to a target UE through the Unified Air Interface, e.g., PC5 interface, without passing through a BS.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one embodiment, a method includes receiving, from a wireless communication node, configuration information of a sidelink medium access control (MAC) control element (CE). The method also includes transmitting, by the first wireless communication device according to the configuration information, the sidelink MAC CE to a second wireless communication device.

In another embodiment, a method includes receiving, by a wireless communication device from a wireless communication node, configuration information of an uplink medium access control (MAC) control element (CE). The method also includes transmitting, by the wireless communication device according to the configuration information, the uplink MAC CE to the wireless communication node.

In yet another embodiment, a method includes determining, by a first sidelink wireless communication device, either to transmit a medium access control (MAC) service data unit (SDU) for a specific sidelink logical channel to a second sidelink wireless communication device or to receive the MAC SDU for the specific sidelink logical channel from the second sidelink wireless communication device. The method also includes starting or restarting, by the first sidelink wireless communication device, a timer in response to the determination.

In yet another embodiment, a method includes determining, by a first sidelink wireless communication device, that a sidelink grant has been configured for transmitting a medium access control (MAC) protocol data unit (PDU). The method also includes reserving, by the first sidelink wireless communication device based on the sidelink grant, a resource to transmit a stand-alone sidelink control information (SCI) to a second sidelink wireless communication device.

In yet another embodiment, a method includes estimating, by a first sidelink wireless communication device, a sidelink grant to be configured for transmitting a medium access control (MAC) protocol data unit (PDU). The method includes reserving, by the first sidelink wireless communication device based on the sidelink grant, a resource to transmit a stand-alone sidelink control information (SCI) to a second sidelink wireless communication device.

In yet another embodiment, a method includes determining, by a first sidelink wireless communication device, that a sidelink grant has been configured for transmitting a medium access control (MAC) protocol data unit (PDU). The method includes reserving, by the first sidelink wireless communication device based on the MAC PDU, a resource to transmit a stand-alone sidelink control information (SCI) to a second sidelink wireless communication device.

The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 4 is a flow diagram depicting a method for reference signaling design and configuration, in accordance with some embodiments of the present disclosure.

FIG. 5 is a flow diagram depicting a method for reference signaling design and configuration, in accordance with some embodiments of the present disclosure.

FIG. 6 is a flow diagram depicting a method for reference signaling design and configuration, in accordance with some embodiments of the present disclosure.

FIG. 7 is a flow diagram depicting a method for reference signaling design and configuration, in accordance with some embodiments of the present disclosure.

DETAILED DESCRIPTION OF EXAMPLE EMBODIMENTS

Figure 1A:
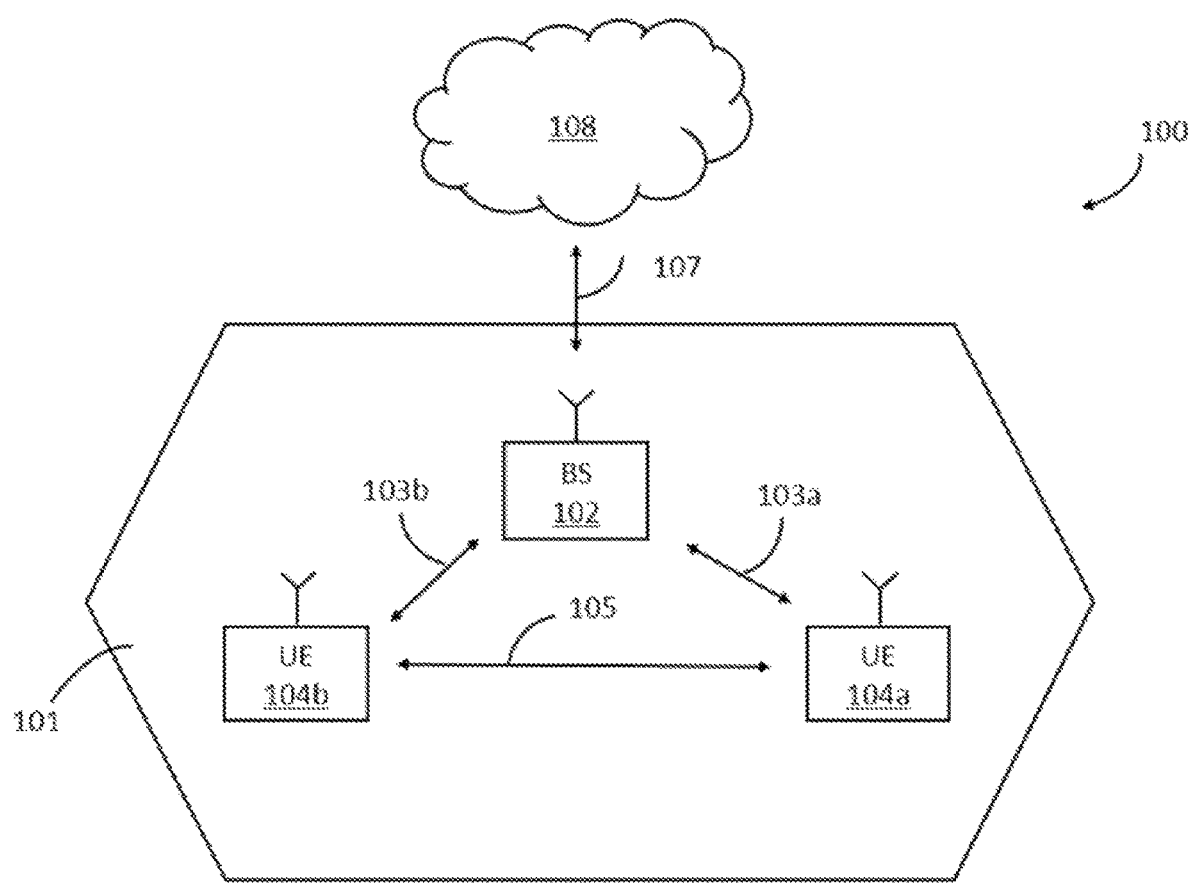
FIG. 1A illustrates an example wireless communication network, in accordance with an embodiment of the present disclosure.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The following acronyms are used throughout the present disclosure:
3GPP 3rd Generation Partnership Project
5G 5th Generation Mobile Networks
5G-AN 5G Access Network
5G gNB Next Generation NodeB
5G NR 5th Generation Mobile Networks New Radio
AP Access Point
BS Base Station
BSR Buffer Status Report
CN Core Network
CSI Channel State Information
D2D Device-to-Device
DL Downlink
ETSI European Telecommunications Standards Institute
gNB gNodeB
LCID Logical Channel ID
LTE Long Term Evolution
MAC-CE Medium Access Control-Control Element
MAC-SDU Medium Access Control Service Data Unit
PDU Protocol Data Unit
RAN Radio Access Network
RRC Radio Resource Control
RS Reference Signal
SL-MAC-CE Sidelink Medium Access Control-Control Element
SL-SCH Sidelink Shared Channel
SL-TX Sidelink Transmission
SRS Sounding Reference Signal
SS Synchronization Signal
TRP Transmission Point
UE User Equipment
UE ID User Equipment Identifier
UL Uplink
V2P Vehicle-to-Pedestrian
V2V Vehicle-to-Vehicle
V2I/V2N Vehicle-To-Infrastructure/Vehicle-to-Network Vehicle networking refers to a large system network for wireless communication and information exchange between vehicles and vehicles, pedestrians, roadside equipment and the Internet in accordance with agreed communication protocols and data interaction standards. Communication through the Internet of Vehicles enables vehicles to achieve driving safety, improve traffic efficiency, and access convenience or entertainment information. Vehicle networking communication includes three different types: vehicle-to-vehicle communication (V2V), communication between vehicles and roadside equipment/network infrastructure (Vehicle-To-Infrastructure/Vehicle-to-Network (V2I/V2N for short), and Vehicle-to-Pedestrian (V2P), collectively referred to as V2X communication.

While conventional systems implementing V2X UEs (Vehicle to everything User Equipment) communication allow allocated data to be sent when waiting for data, such systems, however, do not allow the vehicle or UE to separately transmit control messages from the measurement reports, thereby resulting in poor transmission timeliness.

Furthermore, when the UE does not have a message of the Uu interface (i.e., the logical interface between the UE and the base station) for a long time, the UE enters the RRC idle state. In the idle state, the UE can only use the UE to select the resource to send the V2X message. The service with high reliability cannot guarantee the demand. Connection status application resources cannot guarantee service continuity.

With the advancement of technology and the development of the automation industry, the V2X communication scenario is further extended and with higher performance requirements. Advanced V2X services are divided into four main categories: vehicle platooning, extended sensors, advanced driving (e.g., semi-automated or full-automated driving), and remote driving. Required performance requirements include a packet size supporting 50 to 12000 bytes, a transmission rate of 2 to 50 messages per second, a maximum end-to-end delay 3-500 milliseconds, a reliability of 90%-99.999%, a data rate of 0.5-1000 Mbps (Megabits per second), and a transmission range of 50-1000 meters.

While 3GPP has established a research on vehicle networking communication based on the fifth generation mobile communication technology (5th Generation, 5G for short), there is no car network communication based on 5G air interface or on 5G direct link communication.

Accordingly, there is a long-felt need in providing a reference signaling design and configuration that overcomes the above problems in the art.

1. MAC CE Transmission: Group A

Figure 1B:
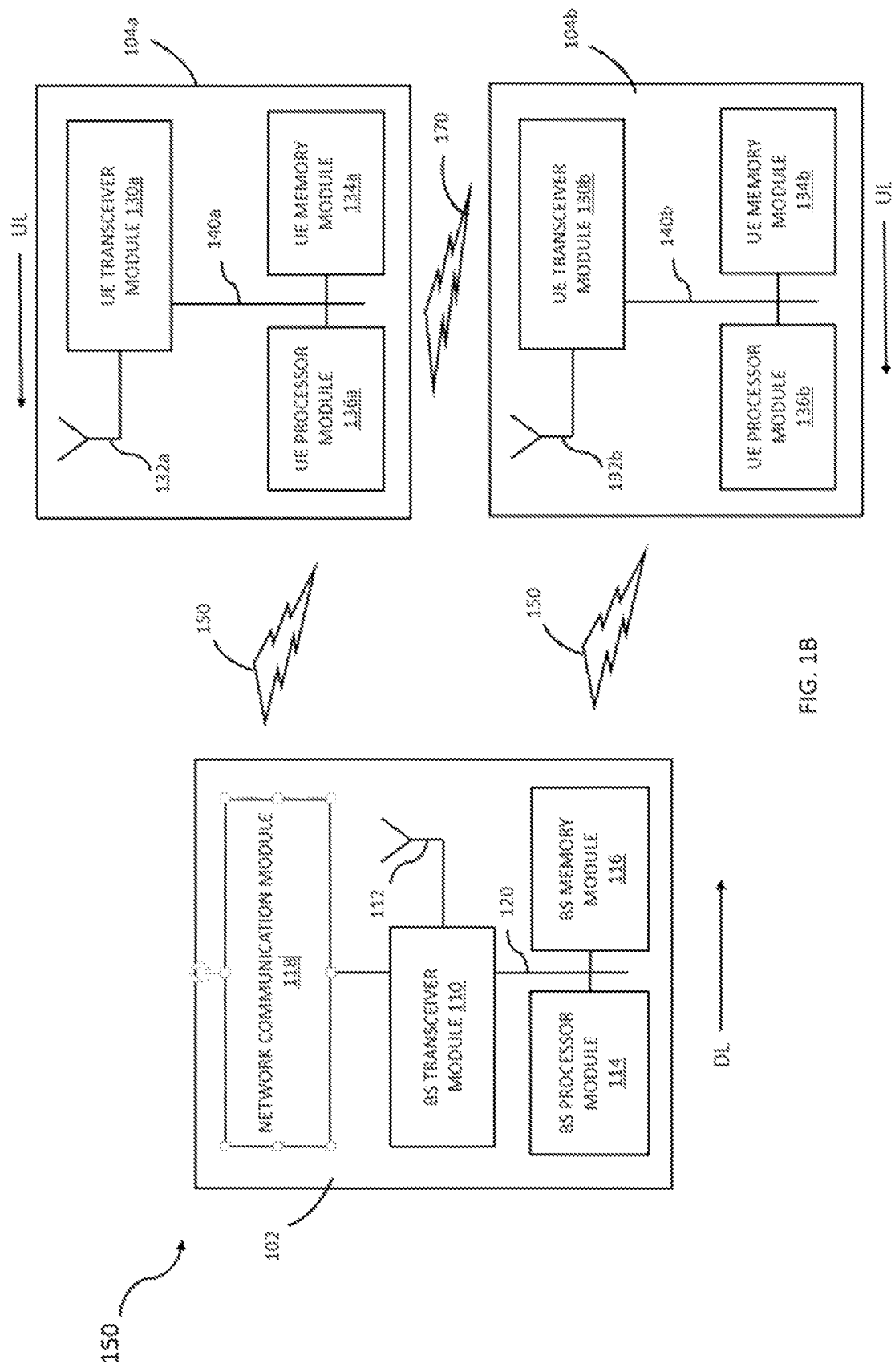
FIG. 1B illustrates a block diagram of an example wireless communication system for transmitting and receiving downlink, uplink, and/or sidelink communication signals, in accordance with some embodiments of the present disclosure.

In a first operation, a UE (e.g., UE 104a or 104b in FIG. 1B) receives configuration information of an SL MAC CE on a network side (e.g., BS 102 in FIG. 1B). In some embodiments, the configuration information may also include a logical channel identifier corresponding to the SL MAC CE. In some embodiments, the configuration information may also include priority information indicating a priority of the SL MAC CE corresponding to the logical channel. In some embodiments, the configuration information may also include a schedulingRequestId indicating the scheduling request configuration applicable for this logical channel. In some embodiments, the configuration information may also include a configuredGrantAllowed. If the configuration information includes a configuredGrantAllowed, then the SL MAC CE from this logical channel may be transmitted on a configured grant. In some embodiments, the configuration information may also include a logical-ChannelGroup indicating which logical channel group the logical channel belongs to. In some embodiments, the configuration information may also include a logicalChannelSR-Mask. A logicalChannelSR-Mask that is set to 'TRUE' indicates that SR masking is configured for this logical channel. In some embodiments, the configuration information may also include a logicalChannelBSR-Mask. A logicalChannelB SR-Mask that is set to 'TRUE' indicates that BSR masking is configured for this logical channel.

In some embodiments, the configuration information may also include a configuredGrantType1Allowed. If the configuration information includes a configuredGrantType1Allowed, then the SL MAC CE from this logical channel can be transmitted on a configured grant type 1. In some embodiments, the configuration information may also include a configuredGrantType2Allowed. If the configuration information includes a configuredGrantType1Allowed, then the SL MAC CE from this logical channel can be transmitted on a configured grant type 2.

In a second operation, the UE sends the SL MAC CE according to the above configuration information. Specifically, after the UE triggers the sending of the CSI report, it is determined according to the foregoing configuration whether the configured Grant resource can be used, whether the BSR can be triggered, whether the SR report and the corresponding SR identifier can be triggered. In some embodiments, when a sidelink MAC CE is generated for the UE, it shall trigger a sidelink BSR. In some embodiments, when the sidelink MAC CE is generated for the UE and the sidelink MAC CE with higher priority than the priorities of the sidelink logical channels or sidelink MAC CE which belong to any LCG belonging to the same ProSe Destination and for which data is already available for transmission, it shall trigger a sidelink BSR. It should be noted that the foregoing embodiment is not limited to the SL MAC CE, and is also applicable to the UL MAC CE.

In some embodiments, the configuration information of the sidelink MAC CE may include at least one of a logical channel identifier (LCID) corresponding to the sidelink MAC CE, a priority value corresponding the LCID, a first indicator (e.g., schedulingRequestId) configured to indicate which allocated scheduling request configuration is applicable for the LCID, a second indicator (e.g., configuredGrantAllowed) configured to indicate whether the sidelink MAC CE is allowed to be transmitted on a configured grant, an identifier (e.g., logicalChannelGroup) indicating an LCID group to which the LCID belongs, a third indicator (e.g., logicalChannel SR-Mask) configured to indicate whether to trigger a scheduling request, and a fourth indicator (e.g., logicalChannelB SR-Mask) configured to indicate whether to trigger a buffer status reporting.

In some embodiments, the second indicator may include a first sub-indicator (e.g., configuredGrantType1Allowed) configured to indicate whether the sidelink MAC CE is allowed to be transmitted on a first type of configured grant, and a second sub-indicator (e.g., configuredGrantType2Allowed) configured to indicate whether the sidelink MAC CE is allowed to be transmitted on a second type of configured grant.

2. MAC CE Transmission: Group B

In a first operation, the UE receives the configuration information of the SL MAC CE on the network side. In some embodiments, the configuration information may include priority information used to indicate the priority of the SL MAC CE. In some embodiments, the configuration information may include a schedulingRequestId. If the configuration information includes a schedulingRequestId, then it indicates the scheduling request configuration applicable for this type of SL MAC CE. In some embodiments, the configuration information may include a configuredGrantAllowed. If the configuration information includes a configuredGrantAllowed, then the indicated SL MAC CE can be transmitted on a configured grant. In some embodiments, the configuration information may include a Group ID used to indicate the logical channel group that the SL MAC CE belongs to. A SR-Mask that is set to 'TRUE' indicates that SR masking is configured for this SL MAC CE. A BSR-Mask that is set to 'TRUE' indicates that BSR masking is configured for this SL MAC CE.

In some embodiments, the configuration information may also include a configuredGrantType1Allowed. If the configuration information includes a configuredGrantType1Allowed, then the SL MAC CE from this logical channel can be transmitted on a configured grant type 1. If the configuration information includes a configuredGrantType2Allowed, then the SL MAC CE from this logical channel can be transmitted on a configured grant type 2.

In some embodiments, the configuration information of the sidelink MAC CE may include at least one of an identifier indicating a type of the sidelink MAC CE, a priority value corresponding to the sidelink MAC CE, a first indicator (e.g., schedulingRequestId) configured to indicate which scheduling request configuration is applicable for the sidelink MAC CE, a second indicator (e.g., configuredGrantAllowed) configured to indicate whether the sidelink MAC CE is allowed to be transmitted on a configured grant, a third indicator (e.g., logicalChannel SR-Mask) configured to indicate whether to trigger a scheduling request, a fourth indicator (e.g., logicalChannelBSR-Mask) configured to indicate whether to trigger a buffer status reporting, and a fifth indicator configured to indicate SR masking is configured for this MAC CE.

In some embodiments, the second indicator may include a first sub-indicator (e.g., configuredGrantType1Allowed) configured to indicate whether the sidelink MAC CE is allowed to be transmitted on a first type of configured grant, and a second sub-indicator (e.g., configuredGrantType2Allowed) configured to indicate whether the sidelink MAC CE is allowed to be transmitted on a second type of configured grant.

In a second operation, the UE sends the SL MAC CE according to the above configuration information. Specifically, after the UE triggers the sending of the CSI report, it is determined according to the foregoing configuration whether the configured Grant resource can be used, whether the BSR can be triggered, whether the SR report and the corresponding SR identifier can be triggered. It should be noted that the above embodiment is not limited to the SL MAC CE, and is also applicable to the UL MAC CE.

In some embodiments, the UE receives MAC CE type list information, and the MAC CE type list is used to indicate all MAC CE types that support the scheduling request. In some embodiments, for each entry in the list, the corresponding schedulingRequestID list should be supported or a unified schedulingRequestID should be configured.

In some embodiments, the UE receives MAC CE type list information, and the MAC CE type list is used to indicate all MAC CE types that are allowed to use the configuredGrant resource.

In some embodiments, the UE receives the MAC CE type list information, where the MAC CE type list is used to indicate all MAC CE types that support the triggering of the BSR.

In some embodiments, the configuration information may also include a configuredGrantType1Allowed. If the configuration information includes a configuredGrantType1Allowed, then the SL MAC CE from this logical channel can be transmitted on a configured grant type 1. If the configuration information includes a configuredGrantType2Allowed, then the SL MAC CE from this logical channel can be transmitted on a configured grant type 2.

In some embodiment, the configuration information of the sidelink MAC CE includes at least one of a first indicator configured to indicate a first list of MAC CE types that support triggering a scheduling request, a second indicator configured to indicate a second list of MAC CE types that is allowed to be transmitted on a configured grant, a third indicator configured to indicate a third list of MAC CE types that support triggering a buffer status reporting, and a fourth indicator configured to indicate a first list of MAC CE types that SR masking is configured.

In some embodiment, the second indicator may further includes a first sub-indicator (e.g., configuredGrantType1Allowed) configured to indicate whether the sidelink MAC CE is allowed to be transmitted on a first type of configured grant, and a second sub-indicator (e.g., configuredGrantType2Allowed) configured to indicate whether the sidelink MAC CE is allowed to be transmitted on a second type of configured grant.

In some embodiment, the first wireless communication device (e.g., UE 104a or UE 104b in FIG. 1B) may further send to a wireless communication node (e.g., BS 102 in FIG. 1B) a buffer status reporting prior to transmitting the sidelink MAC CE to the second wireless communication device. The buffer status reporting may include a field indicating a type of the sidelink MAC CE.

In some embodiments, the first wireless communication device (e.g., e.g., UE 104a or UE 104b in FIG. 1B) may further send to a wireless communication node (e.g., BS 102 in FIG. 1B) a buffer status reporting prior to transmitting the sidelink MAC CE to the second wireless communication device. The buffer status reporting includes a type of the sidelink MAC CE and a buffer size.

In some embodiments, the wireless communication device (e.g., UE 104a or UE 104b in FIG. 1B) may receive from a wireless communication node (e.g., BS 102 in FIG. 1B) configuration information of an uplink medium access control (MAC) control element (CE). The wireless communication device may transmit according to the configuration information, the uplink MAC CE to the wireless communication node.

In some embodiments, the configuration information of the uplink MAC CE may include at least one of a logical channel identifier (LCD) corresponding to the uplink MAC CE, a priority value corresponding the LCID, a first indicator configured to indicate which allocated scheduling request configuration is applicable for the LCID, a second indicator configured to indicate whether the uplink MAC CE is allowed to be transmitted on a configured grant, an identifier indicating an LCID group to which the LCID belongs, a third indicator configured to indicate whether to trigger a scheduling request, and a fourth indicator configured to indicate whether to trigger a buffer status reporting.

In some embodiments, the second indicator may further include a first sub-indicator configured to indicate whether the uplink MAC CE is allowed to be transmitted on a first type of configured grant, and a second sub-indicator configured to indicate whether the uplink MAC CE is allowed to be transmitted on a second type of configured grant.

In some embodiments, the configuration information of the uplink MAC CE includes at least one of an identifier indicating a type of the uplink MAC CE, a priority value corresponding to the uplink MAC CE, a first indicator configured to indicate which scheduling request configuration is applicable for the uplink MAC CE, a second indicator configured to indicate whether the uplink MAC CE is allowed to be transmitted on a configured grant, a third indicator configured to indicate whether to trigger a scheduling request, a fourth indicator configured to indicate whether to trigger a buffer status reporting, and a fifth indicator configured to indicate SR masking is configured for this MAC CE.

In some embodiments, the second indicator further includes a first sub-indicator configured to indicate whether the uplink MAC CE is allowed to be transmitted on a first type of configured grant, and a second sub-indicator configured to indicate whether the uplink MAC CE is allowed to be transmitted on a second type of configured grant.

In some embodiments, the configuration information of the uplink MAC CE includes at least one of a first indicator configured to indicate a first list of MAC CE types that support a scheduling request, a second indicator configured to indicate a second list of MAC CE types that is allowed to be transmitted on a configured grant, a third indicator configured to indicate a third list of MAC CE types that support a buffer status reporting, and a fourth indicator configured to indicate a first list of MAC CE types that SR masking is configured.

In some embodiments, the second indicator further includes a first sub-indicator configured to indicate whether the uplink MAC CE is allowed to be transmitted on a first type of configured grant, and a second sub-indicator configured to indicate whether the uplink MAC CE is allowed to be transmitted on a second type of configured grant.

In some embodiments, the first wireless communication device may send to the wireless communication node, a buffer status reporting prior to transmitting the uplink MAC CE to the second wireless communication device. In some embodiments, the buffer status reporting includes a field indicating a type of the uplink MAC CE.

In some embodiments, the first wireless communication device may send to the wireless communication node a buffer status reporting prior to transmitting the uplink MAC CE to the second wireless communication device. The buffer status reporting includes a type of the uplink MAC CE and a buffer size.

For example, in a first operation, the UE receives the configuration information sent by the BS. The configuration information is configured to indicate that the UE allocates a sidelink resource using a mode scheduled by the BS. The UE also receives a sidelink resource pool configuration information. In a second operation, if the UE attempts to send the SL MAC CE but determines that there is no SL resource available, then the UE selects the resource from the sidelink resource pool to send the SL MAC CE.

As another example, in a first operation, the UE receives the configuration information sent by the BS. The configuration information is configured to indicate that the UE can use a mode of UE-selecting resource to obtain the sidelink resource to send the SL MAC CE. The US also receives the sidelink resource pool configuration information. The UE also receives the SL MAC CE list which is used to indicate which SL MAC CEs can use the mode of UE-select resources to obtain sidelink resource for sending. In a second operation, if the UE attempts to send the SL MAC CE which belongs to the received SL MAC CE list if it receives a MAC CE list during the first operation but determines that there is no SL resource available, then the UE selects the resource from the sidelink resource pool to send the SL MAC CE.

3. Mobile Communication Technology and Environment

Referring to FIG. 1A, an example wireless communication network 100 is shown. The wireless communication network 100 illustrates a group communication within a cellular network. In a wireless communication system, a network side communication node or a base station (BS) can include a next Generation Node B (gNB), an E-utran Node B (also known as Evolved Node B, eNodeB or eNB), a pico station, a femto station, a Transmission/Reception Point (TRP), an Access Point (AP), or the like. A terminal side node or a user equipment (UE) can include a long range communication system such as, for example, a mobile device, a smart phone, a personal digital assistant (PDA), a tablet, a laptop computer, or a short range communication system such as, for example a wearable device, a vehicle with a vehicular communication system, or the like. In FIG. 1A, a network side and a terminal side communication node are represented by a BS 102 and a UE 104a or 104b, respectively, and in the embodiments in this disclosure hereafter. In some embodiments, the BS 102 and UE 104a/104b are sometimes referred to as "wireless communication node" and "wireless communication device," respectively. Such communication nodes/devices can perform wireless and/or wired communications.

In the illustrated embodiment of FIG. 1A, the BS 102 can define a cell 101 in which the UEs 104a-b are located. The UE 104a can include a vehicle that is moving within a coverage of the cell 101. The UE 104a can communicate with the BS 102 via a communication channel 103a. Similarly, the UE 104b can communicate with the BS 102 via a communication channel 103b. In addition, the UEs 104a-b can communicate with each other via a communication channel 105. The communication channels (e.g., 103a-b) between the UE and the BS can be through interfaces such as an Uu interface, which is also known as UMTS (Universal Mobile Telecommunication System (UMTS) air interface. The communication channels (e.g., 105) between the UEs can be through a PC5 interface, which is introduced to address high moving speed and high density applications such as, for example, Vehicle-to-Vehicle (V2V) communications, Vehicle-to-Pedestrian (V2P) communications, Vehicle-to-Infrastructure (V2I) communications, Vehicle-to-Network (V2N) communications, or the like. In some instances, such car network communications modes can be collective referred to as Vehicle-to-Everything (V2X) communications. It is appreciated that the communications channels between the UEs can be used in Device-to-Device (D2D) communications while remaining within the scope of the present disclosure. The BS 102 is connected to a core network (CN) 108 through an external interface 107, e.g., an Iu interface.

FIG. 1B illustrates a block diagram of an example wireless communication system 150 for transmitting and receiving downlink, uplink and sidelink communication signals, in accordance with some embodiments of the present disclosure. The system 150 may include components and elements configured to support known or conventional operating features that need not be described in detail herein. In one embodiment, the system 150 can transmit and receive data symbols in a wireless communication environment such as the wireless communication network 100 of FIG. 1A, as described above.

The system 150 generally includes the BS 102 and UEs 104a-b, as described in FIG. 1A. The BS 102 includes a BS transceiver module 110, a BS antenna 112, a BS memory module 116, a BS processor module 114, and a network communication module 118, each module being coupled and interconnected with one another as necessary via a data communication bus 120. The UE 104a includes a UE transceiver module 130a, a UE antenna 132a, a UE memory module 134a, and a UE processor module 136a, each module being coupled and interconnected with one another as necessary via a data communication bus 140a. Similarly, the UE 104b includes a UE transceiver module 130b, a UE antenna 132b, a UE memory module 134b, and a UE processor module 136b, each module being coupled and interconnected with one another as necessary via a data communication bus 140b. The BS 102 communicates with the UEs 104a-b via one or more of a communication channel 150, which can be any wireless channel or other medium known in the art suitable for transmission of data as described herein.

As would be understood by persons of ordinary skill in the art, the system 150 may further include any number of modules other than the modules shown in FIG. 1B. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present disclosure.

A wireless transmission from an antenna of one of the UEs 104a-b to an antenna of the BS 102 is known as an uplink transmission, and a wireless transmission from an antenna of the BS 102 to an antenna of one of the UEs 104a-b is known as a downlink transmission. In accordance with some embodiments, each of the UE transceiver modules 130a-b may be referred to herein as an uplink transceiver, or UE transceiver. The uplink transceiver can include a transmitter and receiver circuitry that are each coupled to the respective antenna 132a-b. A duplex switch may alternatively couple the uplink transmitter or receiver to the uplink antenna in time duplex fashion. Similarly, the BS transceiver module 110 may be herein referred to as a downlink transceiver, or BS transceiver. The downlink transceiver can include RF transmitter and receiver circuitry that are each coupled to the antenna 112. A downlink duplex switch may alternatively couple the downlink transmitter or receiver to the antenna 112 in time duplex fashion. The operations of the transceivers 110 and 130a-b are coordinated in time such that the uplink receiver is coupled to the antenna 132a-b for reception of transmissions over the wireless communication channel 150 at the same time that the downlink transmitter is coupled to the antenna 112. In some embodiments, the UEs 104a-b can use the UE transceivers 130a-b through the respective antennas 132a-b to communicate with the BS 102 via the wireless communication channel 150. The wireless communication channel 150 can be any wireless channel or other medium known in the art suitable for downlink (DL) and/or uplink (UL) transmission of data as described herein. The UEs 104a-b can communicate with each other via a wireless communication channel 170. The wireless communication channel 170 can be any wireless channel or other medium known in the art suitable for sidelink transmission of data as described herein.

Each of the UE transceiver 130a-b and the BS transceiver 110 are configured to communicate via the wireless data communication channel 150, and cooperate with a suitably configured antenna arrangement that can support a particular wireless communication protocol and modulation scheme. In some embodiments, the UE transceiver 130a-b and the BS transceiver 110 are configured to support industry standards such as the Long Term Evolution (LTE) and emerging 5G standards, or the like. It is understood, however, that the present disclosure is not necessarily limited in application to a particular standard and associated protocols. Rather, the UE transceiver 130a-b and the BS transceiver 110 may be configured to support alternate, or additional, wireless data communication protocols, including future standards or variations thereof.

The processor modules 136a-b and 114 may be each implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 114 and 136a-b, respectively, or in any practical combination thereof. The memory modules 116 and 134a-b may be realized as RAM memory, flash memory, ROM memory, EPROM memory, EEPROM memory, registers, a hard disk, a removable disk, a CD-ROM, or any other form of storage medium known in the art. In this regard, the memory modules 116 and 134a-b may be coupled to the processor modules 114 and 136a-b, respectively, such that the processors modules 114 and 136a-b can read information from, and write information to, memory modules 116 and 134a-b, respectively. The memory modules 116 and 134a-b may also be integrated into their respective processor modules 114 and 136a-b. In some embodiments, the memory modules 116 and 134a-b may each include a cache memory for storing temporary variables or other intermediate information during execution of instructions to be executed by processor modules 114 and 136a-b, respectively. Memory modules 116 and 134a-b may also each include non-volatile memory for storing instructions to be executed by the processor modules 114 and 136a-b, respectively.

The network interface 118 generally represents the hardware, software, firmware, processing logic, and/or other components of the BS 102 that enable bi-directional communication between BS transceiver 110 and other network components and communication nodes configured to communication with the BS 102. For example, the network interface 118 may be configured to support internet or WiMAX traffic. In a typical deployment, without limitation, the network interface 118 provides an 802.3 Ethernet interface such that BS transceiver 110 can communicate with a conventional Ethernet based computer network. In this manner, the network interface 118 may include a physical interface for connection to the computer network (e.g., Mobile Switching Center (MSC)). The terms "configured for" or "configured to" as used herein with respect to a specified operation or function refers to a device, component, circuit, structure, machine, signal, etc. that is physically constructed, programmed, formatted and/or arranged to perform the specified operation or function. The network interface 118 can allow the BS 102 to communicate with other BSs or core network over a wired or wireless connection.

In some embodiments, each of the UEs 104a-b can operate in a hybrid communication network in which the UE communicates with the BS 102, and with other UEs, e.g., between 104a and 104b. As described in further detail below, the UEs 104a-b support sidelink communications with other UE's as well as downlink/uplink communications between the BS 102 and the UEs 104a-b. In general, the sidelink communication allows the UEs 104a-b to establish a direct communication link with each other, or with other UEs from different cells, without requiring the BS 102 to relay data between UEs.

4. Sidelink Medium Access Control Element

The CSI report MAC CE is identified by a MAC subheader with LCID as specified in Table 6.2.1-2 in ETSI 123.502, which is hereby incorporated by reference in its entirety. The MAC subheader includes a field associated with a CSI report, a field associated with an RI report, and/or a field associated with a destination ID. In some embodiments, the length of the field associated with a CSI report is 5 bits. In some embodiments, the length of the field associated with an RI report is 1 bit. In some embodiments, the length of the field associated with a destination ID is 16 bits. In some embodiments, the MAC subheader includes a field associated with a destination UE ID.

In some embodiments, a first wireless communication device (e.g., UE 104a in FIG. 1B) may receive from a wireless communication node (e.g., BS 103 in FIG. 1B) configuration information of a sidelink medium access control (MAC) control element (CE). The first wireless communication device may transmit, according to the configuration information, the sidelink MAC CE to a second wireless communication device (e.g., UE 104b in FIG. 1B). The sidelink MAC CE may include a channel status information (CSI) report. The sidelink MAC CE may further include a rank indicator (RI) report, a destination identifier, and/or a destination user equipment (UE) identifier.

5. Logical Channel Prioritization

If the SL MAC CE is introduced, then a priority relationship between the SL MAC CE and the data from SL Logical Channel should be considered during Logical Channel Prioritization procedure. In some embodiments, the priority of each SL Logical Channel is either configured by the network or pre-configured. In response to configuring the priority of each SL Logical Channel, the priority of the data SL logical channel and SL MAC CE may be directly compared. In some embodiments, considering the signal overhead of SL MAC CE may be one byte, which is much smaller than data MAC SDU, the SL MAC CE may be prioritized.

In addition, when the transmission of the SL MAC CE and the transmission of the UL data or signaling cannot be performed simultaneously, the SL transmission is prioritized if the highest priority value of UL LCH(s) with available data is larger than the UL priority threshold and the highest priority value of SL LCH(s) and SL MAC CE with available data is lower than the SL priority threshold. Otherwise the UL transmission is prioritized. For example, the SL priority threshold and UL priority threshold is received by the first wireless communication device from the network.

In some embodiments, the first wireless communication device (e.g., UE 104a in FIG. 1B), may determine a first priority value of the sidelink MAC CE. The first wireless communication device may compare the first priority value of the sidelink MAC CE with a second priority value of data from a sidelink logical channel. The first wireless communication device may prioritize transmission of the sidelink MAC CE over transmission of the data from the sidelink logical channel in response to determining that the first priority value is greater than the second priority value.

In some embodiment, the first wireless communication device may determine a priority value of the sidelink MAC CE. The first wireless communication device may compare the priority value of the sidelink MAC CE with a configured threshold of sidelink-transmission (SL-TX) prioritization. The first wireless communication device may prioritize transmission of a sidelink MAC protocol data unit (PDU) including the sidelink MAC CE over uplink transmission in response to determining that the priority value is lower than the configured threshold, when the transmission of the sidelink MAC PDU and uplink transmission cannot be simultaneously performed.

6. Scheduling Request

Each Scheduling Request (SR) configuration corresponds to one or more logical channels. Each logical channel may be mapped to zero or one SR configuration, which is configured by RRC. The SR configuration of the logical channel that triggered the Buffer Status Report (BSR) is considered as corresponding SR configuration for the triggered SR.

Considering the SL MAC CE of CSI report may be sent without data transmitting, it may trigger SR/BSR by its own if having no available SL and UL resource, which is different with current UL MAC CE. Therefore, the CSI report SL MAC CE may be mapped to zero or one SR configuration, which is configured by RRC.

If the network side configures the UE to allocate resources using the mode in which the UE selects resources, the SR/BSR is not triggered.

If the UE resource allocation mode is configured based on each SL logical channel, only the logical channel configured as the base station scheduling mode will be configured with the corresponding SR configuration.

7. Data Inactivity Monitoring

For NR, for some services with low latency or high reliability requirements, it is desirable to use the method of base station scheduling to obtain resources. If such delay or reliability-required services arrive, the UE needs to enter RRC connected state. The connection state applies for the V2X resource, then if the UE is currently in the RRC connected state, when such V2X service arrives, start or restart dataInactivityTimer. That is, if any MAC entity transmits or receives a MAC SDU for specific SL-SCH logical channel, then start or restart the dataInactivityTimer.

The specific SL-SCH logical channel may support various configurations. In some embodiments, the logical channel configuration indicates whether the dataInactivityTimer is supported. If it is supported, then when sending or receiving the MAC SDU of the logical channel, the dataInactivity-Timer may be started or restarted. In some embodiments, the logical channel configuration indicates whether the mode of the base station scheduling is only supported. If only the mode of the base station scheduling is supported, when the MAC SDU of the logical channel is sent or received, the dataInactivityTimer may be started or restarted.

The sending and receiving can also be separately configured. In some embodiments, the logical channel configuration indicates whether a TX-dataInactivityTimer is supported in the logical channel configuration. If it is supported, then when sending the MAC SDU of the logical channel, the dataInactivityTimer may be started or restarted. In some embodiments, the logical channel configuration indicates whether RX-dataInactivityTimer is supported. If supported, when receiving the MAC SDU of the logical channel, the dataInactivityTimer may be started or restarted.

In some embodiments, the UE may be configured by RRC with a Data inactivity monitoring functionality, when in RRC CONNECTED. The RRC controls Data inactivity operation by configuring the timer dataInactivityTimer.

In some embodiments, when dataInactivityTimer is configured and if any MAC entity receives a MAC SDU for specific SL-SCH logical channel which is configured with dataInactivityTimer, then the dataInactivityTimer may be started or restarted.

In some embodiments, when dataInactivityTimer is configured and if any MAC entity transmits a MAC SDU for specific SL-SCH logical channel which is configured with dataInactivityTimer, then the dataInactivityTimer may be started or restarted.

In some embodiments, when dataInactivityTimer expires, then the expiry of the dataInactivityTimer is indicated to the upper layers.

In some embodiments, the receiving, by the UE, configuration information of the SL logical channel includes: indicating whether to configure the dataInactivityTimer, and if configured, when sending or receiving the MAC SDU of the logical channel, starting or restarting dataInactivityTimer. In some embodiments, in the logical channel configuration, whether to support the base station scheduling mode to obtain resources, and if so, when sending or receiving the MAC SDU of the logical channel, start or restart dataInactivityTimer.

In some embodiment, a first sidelink wireless communication device (e.g., UE 104a or UE 104b in FIG. 1B) determines either to transmit a medium access control (MAC) service data unit (SDU) for a specific sidelink logical channel to a second sidelink wireless communication device or to receive the MAC SDU for the specific sidelink logical channel from the second sidelink wireless communication device. The first sidelink wireless communication device starts or restart, by the first sidelink wireless communication device, a timer in response to the determination.

In some embodiments, the timer includes a dataInactivity Timer.

In some embodiments, the first sidelink wireless communication device determines the specific sidelink logical channel by receiving logical channel configuration information. The logical channel configuration information includes an indicator configured to indicate whether to start or restart the timer when transmitting or receiving the MAC SDU from this sidelink logical channel.

In some embodiments, the first sidelink wireless communication device determines the specific sidelink logical channel by receiving, by the first sidelink wireless communication device, logical channel configuration information. The logical channel configuration information includes an indicator configured to indicate the resource allocation mode of this sidelink logical channel is scheduled mode.

In some embodiments, the first sidelink wireless communication device indicates an expiry of the timer to an upper layer.

8. Stand-Alone SCI

In RAN1, it has been agreed that a kind of stand-alone SCI will be used for sidelink initial data grant resource reservation. Such stand-alone SCI will be transmitted without the association of data MAC PDU transmission. The purpose to transmit such stand-alone SCI is to reserve resource for sidelink data MAC PDU. In addition, it has been agreed that the stand-alone SCI will be transmitted in physical layer with only one sub-channel frequency domain resource. Therefore, one potential raised issue is that how to request sidelink resource for such stand-alone SCI, as well as how MAC layer guide PHY layer to fill in the information in the stand-alone SCI if there is no associated data MAC PDU.

In the following, three different solutions are given, referred to herein as "Solution 1", "Solution 2", and "Solution 3".

The assumption for Solution 1 is that at the time being UE needs to transmit reserve indication, the MAC PDU of the corresponding data has already been assembled, and based on a RAN1 proposal, referred to herein as "Alt 1-2".

The assumption for Solution 2 is that at the time being UE needs to transmit reserve indication, there is no available sidelink data and available sidelink data grant, and based on another RAN1 proposal, referred to herein as "Alt 1-2."

The assumption for Solution 3 is based on RAN1 Proposal Alt 1-1, of which the assumption is that MAC layer will pass the initial MAC PDU with a configured sidelink grant to physical layer, associated with an explicit indication for transmission of stand-alone SCI. After the physical layer receive those information, it will truncate only one sidelink grant with filling in part of MAC PDU. Then after rate matching, the physical layer will filling the stand-alone SCI information to the one-subchannel grant.

In some embodiments, the device (e.g., UE 104a or UE 104b in FIG. 1B) should support at least an initial transmission and reservation of the resource(s) for retransmission(s) to have the same number of sub-channels.

In some embodiments, the device down-selects one of the following based on "Alt 1", "Alt 1-1", "Alt 1-2", or "Alt 2".

In some embodiments, referred to herein as "Alt. 1", the device support a single sub-channel PSCCH+PSSCH reserving resource(s).

In some embodiments, referred to herein as "Alt. 1-1", for retransmission(s) of a TB with a larger number of sub-channels, where PSSCH REs are occupied by 2nd stage SCI and by SCH, 1 bit indication is carried in 1st stage SCI to distinguish the single sub-channel.

In some embodiments, referred to herein as "Alt. 1-2", for the initial transmission and possibly retransmission(s) of a TB with a larger number of sub-channels, where all available PSSCH REs in the single sub-channel PSCCH+PSSCH are occupied only by 2nd stage SCI, FFS how to indicate.

In some embodiments, referred to herein as "Alt. 2", do not support the different number of sub-channels between initial transmission and reservation of the resource(s) for retransmission(s). In some embodiments, "Alt 1" is not supported in this case.

8.1 Stand-Alone SCI: Solution 1

When the UE is going to perform NR sidelink communication and/or V2X sidelink communication, if the MAC entity is configured by upper layers to transmit using pool(s) of resources in one or multiple carriers based on sensing, or partial sensing, or random selection only if upper layers indicates that transmissions of multiple MAC PDUs are allowed, and the MAC entity has already created a configured sidelink grant corresponding to transmissions of the initial MAC PDU, and data is available in STCH associated with one or multiple carriers, the MAC entity shall for each sidelink process configured for multiple transmissions.

In some embodiments, referred to herein as "Alt 1-1", if there is no configured sidelink grant for the transmission of the stand-alone SCI used for reserve indication on the resource pool which is the same as the configured sidelink grant corresponding to transmissions of initial MAC PDUs, trigger random selection in the resource pool with the frequency resource range of one sub-channel, and the time domain of X slots prior of the sidelink grant corresponding to transmissions of initial MAC PDUs, where X can be configured via higher layer.

In some embodiments, referred to herein as "Alt 1-2", if there is no configured sidelink grant for the transmission of the stand-alone SCI used for reserve indication on the resource pool which is the vsame as the configured sidelink grant corresponding to the transmission of initial MAC PDUs, trigger sensing based resource selection with one sub-channel frequency resource range, and the time domain of X slots prior of the sidelink grant corresponding to transmissions of initial MAC PDUs, where X can be configured via higher layer.

Otherwise, if there is a configured sidelink grant for the transmission of the stand-alone SCI used for reserve indication on the resource pool, with one sub-channel frequency resource range, then (1) select the time and frequency resource location corresponding to the resource location of the selected sidelink grant used for initial MAC PDU transmission and pass the time and frequency resource location to physical layer, (2) select the priority value which is the same as the value indicated in the SCI corresponding to the MAC PDU and pass the priority value to physical layer, (3) pass the one-subchannel sidelink grant used for reserve indication to physical layer, (4) and/or pass the resource reservation indication to physical layer to make PHY layer know that the grant will be filled with a stand-alone SCI used for resource reservation.

In some embodiments, the stand-alone SCI used for reserve indication can be optionally transmitted only if the priority value lower than or higher than a threshold value, where the threshold value can be configured via higher layer.

In some embodiments, the first sidelink wireless communication device determines that a sidelink grant has been configured for transmitting a medium access control (MAC) protocol data unit (PDU). The first sidelink wireless communication device reserves based on the sidelink grant, a resource to transmit a stand-alone (i.e., refers to no data being contained therein) sidelink control information (SCI) to a second sidelink wireless communication device.

In some embodiments, the first sidelink wireless communication device randomly selects, from a resource pool, a sub-channel as the resource in a frequency-domain, and selects a time slot, which is X slots prior to the sidelink grant, as the resource in a time-domain, wherein X is configured by a wireless communication node in a layer higher than a MAC layer.

In some embodiments, the first sidelink wireless communication device selects from a resource pool based on respective sensed power levels, a sub-channel as the resource in a frequency-domain, and selects a time slot, which is X slots prior to the sidelink grant, as the resource in a time-domain, wherein X is configured in a layer higher than a MAC layer.

In some embodiments, the first sidelink wireless communication device passes, from a MAC layer to a PHY layer, a frequency-domain location and time-domain location of the sidelink grant. The first sidelink wireless communication device also fills, in the physical layer, the frequency domain location and time domain location of the sidelink grant in the stand alone SCI. The first sidelink wireless communication device also passes, from the MAC layer to the PHY layer, a priority value of the MAC PDU. The first sidelink wireless communication device also fills, in the physical layer, the priority value of the MAC PDU in the stand alone SCI. The first sidelink wireless communication device also passes, from the MAC layer to the PHY layer, a reservation indicator for the sidelink grant.

In some embodiments, the first sidelink wireless communication device transmits, to the second sidelink wireless communication device, the stand-alone SCI based on determining that the priority value satisfies a predefined condition.

8.2 Stand-Alone SCI: Solution 2

When the UE is going to perform NR sidelink communication and/or V2X sidelink communication, if the MAC entity is configured by upper layer to transmit using pool(s) of resources in one or multiple carriers based on sensing, or partial sensing, or random selection only if upper layers indicates that transmissions of multiple MAC PDUs are allowed, and the MAC entity expects to create a configured sidelink grant corresponding to transmission of the initial MAC PDU, and data is expected to be in STCH associated with one or multiple carriers, the MAC entity shall for each Sidelink process configured for multiple transmissions:

In some embodiments, referred to herein as "Alt 1-1", if there is no configured sidelink grant for the transmission of the stand-alone SCI used for reserve indication on the resource pool which is the same as the configured sidelink grant corresponding to the expected of initial MAC PDUs, trigger random selection in the resource pool with the frequency resource range of one sub-channel, and the time domain of X slots prior of the expected sidelink grant corresponding to the expected initial MAC PDUs, where X can be configured via higher layer.

In some embodiments, referred to herein as "Alt 1-2", if there is no configured sidelink grant for the transmission of the stand-alone SCI used for reserve indication on the resource pool which is the same as the configured sidelink grant corresponding to the expected initial MAC PDUs, trigger sensing based resource selection with one sub-channel frequency resource range, and the time domain of X slots prior of the sidelink grant corresponding to the expected initial MAC PDUs, where X can be configured via higher layer.

Otherwise, if there is a configured sidelink grant for the transmission of the stand-alone SCI used for reserve indication on the resource pool, with one sub-channel frequency resource range, then (1) select the time and frequency resource location corresponding to the resource location of the expected sidelink grant used for initial MAC PDU transmission and pass the time and frequency resource location to physical layer; (2) select the priority value according to the expected MAC PDU and pass the priority value to physical layer; (3) pass the one-subchannel sidelink grant used for reserve indication to physical layer; and/or (4) pass the resource reservation indication to physical layer to make the physical (PHY) layer know that the grant will be filled with a stand-alone SCI used for resource reservation.

In some embodiments, the reserve indication may be transmitted only if the priority value lower than or higher than a threshold value, where the threshold value can be configured via higher layer.

In some embodiments, the first sidelink wireless communication device estimates a sidelink grant to be configured for transmitting a medium access control (MAC) protocol data unit (PDU), and reserves, based on the sidelink grant, a resource to transmit a stand-alone sidelink control information (SCI) to a second sidelink wireless communication device.

In some embodiments, the first sidelink wireless communication device randomly selects, from a resource pool, a sub-channel as the resource in a frequency-domain, and selects a time slot, which is X slots prior to the sidelink grant, as the resource in a time-domain. In some embodiments, the X may be configured in a layer higher than a MAC layer.

In some embodiments, the first sidelink wireless communication device selects, from a resource pool based on respective sensed power levels, a sub-channel as the resource in a frequency-domain; and selects a time slot, which is X slots prior to the sidelink grant, as the resource in a time-domain. In some embodiments, X may be configured in a layer higher than a MAC layer.

In some embodiments, the first sidelink wireless communication device passes, from a MAC layer to a PHY layer, a frequency-domain location and time-domain location of the sidelink grant. The first sidelink wireless communication device also fills, in the physical layer, the frequency domain location and time domain location of the sidelink grant in the stand alone SCI. The first sidelink wireless communication device also passes, from the MAC layer to the PHY layer, a priority value of the MAC PDU. The first sidelink wireless communication device also fills, in the physical layer, the priority value of the MAC PDU in the stand alone SCI. The first sidelink wireless communication device also passes, from the MAC layer to the PHY layer, a reservation indicator for the sidelink grant.

In some embodiments, the first sidelink wireless communication device transmits, to the second sidelink wireless communication device, the stand-alone SCI based on determining that the priority value satisfies a predefined condition.

8.3 Stand-Alone SCI: Solution 3

When the UE is going to perform NR sidelink communication and/or V2X sidelink communication, if the MAC entity is configured by upper layers to transmit using pool(s) of resources in one or multiple carriers based on sensing, or partial sensing, or random selection only if upper layers indicates that transmissions of multiple MAC PDUs are allowed, and the MAC entity selects to create a configured sidelink grant corresponding to transmissions of initial MAC PDUs, and data is available in STCH associated with one or multiple carriers, the MAC entity shall for each Sidelink process configured for multiple transmissions.

In some embodiments, if there is no configured sidelink grant on any resource pool allowed for the STCH associated with the Sidelink process as indicated by upper layers, the UE will perform random selection or sensing based selection to select a sidelink grant with one/or more sub-channel frequency resource range, optionally, UE can according to the MAC PDU to select an appropriate sub-channel size rather than 1.

In some embodiments, the device (e.g., BS 102, UE 104a, or UE 104b in FIG. 1B) randomly selects the time and frequency resources for one transmission opportunity of SCI and SL-SCH from the resources indicated by the physical layer and pass the time and frequency resource location to physical layer.

In some embodiments, the device selects a MCS which is, if configured, within the range that is configured by upper layers. In some embodiments, the device selects a pre-configured MCS used for reserve indication specially, indicate the MCS value to physical layer.

In some embodiments, the device selects a priority value which is the highest priority of the sidelink logical channel in the MAC PDU, and indicate the priority value to physical layer.

In some embodiments, the device indicates to physical layer that this transmission is used for transmission of stand-alone SCI used for reserve indication.

In some embodiments, if the initial transmission is indicated as reserve indication in MAC layer, then the MAC entity will re-transmit the same initial MAC PDU again with exact same version number.

In some embodiments, the reserve indication may be transmitted only if the priority value lower than or higher than a threshold value, where the threshold value can be configured via higher layer.

In some embodiments, the first sidelink wireless communication device determines that a sidelink grant has been configured for transmitting a medium access control (MAC) protocol data unit (PDU). The first sidelink wireless communication device also reserves, based on the MAC PDU (e.g., the MAC PDU is passed to the physical layer for configuring the resource), a resource to transmit a stand-alone sidelink control information (SCI) to a second sidelink wireless communication device.

In some embodiments, the first sidelink wireless communication device randomly selects, from a resource pool, a group of sub-channels as the sidelink grant in a frequency-domain.

In some embodiments, the first sidelink wireless communication device selects, from a resource pool based on respective sensed power levels, a group of sub-channels as the sidelink grant in a frequency-domain.

In some embodiments, the first sidelink wireless communication device includes, in a MAC layer, a frequency-domain location and time-domain location of the sidelink grant in the MAC PDU. The first sidelink wireless communication device also includes, in the MAC layer, a modulation coding scheme (MCS) in the MAC PDU. The first sidelink wireless communication device also includes, in the MAC layer, a highest one of a plurality of priority values in the MAC PDU. In some embodiments, the plurality of priority values correspond to respective logical channels. The first sidelink wireless communication device also passes, from the MAC layer to a PHY layer, the frequency-domain location and the time-domain location of the sidelink grant, the MCS, and the highest priority value. The first sidelink wireless communication device also passes, from the MAC layer to the PHY layer, the MAC PDU with indication to reserve the resource to transmit the stand-alone SCI.

In some embodiments, the first sidelink wireless communication device transmits, to the second sidelink wireless communication device, the stand-alone SCI based on determining that a priority value of the MAC PDU satisfies a predefined condition.

Figure 2:
FIG. 2 is a flow diagram depicting a method for reference signaling design and configuration, in accordance with some embodiments of the present disclosure.

FIG. 2 is a flow diagram depicting a method for reference signaling design and configuration from the perspective of a wireless communication device, in accordance with some embodiments of the present disclosure. Additional, fewer, or different operations may be performed in the method depending on the particular embodiment. In some embodiments, some or all operations of method 200 may be performed by a wireless communication node, such as BS 102 in FIG. 1B. In some operations, some or all operations of method 200 may be performed by a wireless communication device, such as UE 104a in FIG. 1B. In some operations, some or all operations of method 200 may be performed by a wireless communication device, such as UE 104b in FIG. 1B. Each operation may be re-ordered, added, removed, or repeated.

As shown, the method 200 includes the operation 202 of receiving, by a first wireless communication device from a wireless communication node, configuration information of a sidelink medium access control (MAC) control element (CE). The method 200 also includes the operation of 204 of transmitting, by the first wireless communication device according to the configuration information, the sidelink MAC CE to a second wireless communication device.

Figure 3:
FIG. 3 is a flow diagram depicting a method for reference signaling design and configuration, in accordance with some embodiments of the present disclosure.

FIG. 3 is a flow diagram depicting a method for reference signaling design and configuration, in accordance with some embodiments of the present disclosure. Additional, fewer, or different operations may be performed in the method depending on the particular embodiment. In some embodiments, some or all operations of method 300 may be performed by a wireless communication node, such as BS 102 in FIG. 1B. In some operations, some or all operations of method 300 may be performed by a wireless communication device, such as UE 104a in FIG. 1B. In some operations, some or all operations of method 300 may be performed by a wireless communication device, such as UE 104b in FIG. 1B. Each operation may be re-ordered, added, removed, or repeated.

As shown, the method 300 includes the operation 302 of receiving, by a wireless communication device from a wireless communication node, configuration information of an uplink medium access control (MAC) control element (CE). The method 300 includes operation 304 of transmitting, by the wireless communication device according to the configuration information, the uplink MAC CE to the wireless communication node.

FIG. 4 is a flow diagram depicting a method for reference signaling design and configuration, in accordance with some embodiments of the present disclosure. Additional, fewer, or different operations may be performed in the method depending on the particular embodiment. In some embodiments, some or all operations of method 400 may be performed by a wireless communication node, such as BS 102 in FIG. 1B. In some operations, some or all operations of method 400 may be performed by a wireless communication device, such as UE 104a in FIG. 1B. In some operations, some or all operations of method 400 may be performed by a wireless communication device, such as UE 104b in FIG. 1B. Each operation may be re-ordered, added, removed, or repeated.

As shown, the method 400 includes the operation 402 of determining, by a first sidelink wireless communication device, either to transmit a medium access control (MAC) service data unit (SDU) for a specific sidelink logical channel to a second sidelink wireless communication device or to receive the MAC SDU for the specific sidelink logical channel from the second sidelink wireless communication device. The method 400 includes the operation 404 of starting or restarting, by the first sidelink wireless communication device, a timer in response to the determination.

FIG. 5 is a flow diagram depicting a method for reference signaling design and configuration, in accordance with some embodiments of the present disclosure. Additional, fewer, or different operations may be performed in the method depending on the particular embodiment. In some embodiments, some or all operations of method 500 may be performed by a wireless communication node, such as BS 102 in FIG. 1B. In some operations, some or all operations of method 500 may be performed by a wireless communication device, such as UE 104a in FIG. 1B. In some operations, some or all operations of method 500 may be performed by a wireless communication device, such as UE 104b in FIG. 1B. Each operation may be re-ordered, added, removed, or repeated.

As shown, the method 500 includes the operation 502 of randomly selecting, by the first sidelink wireless communication device from a resource pool, a sub-channel as the resource in a frequency-domain. The method 500 includes the operation 504 of selecting, by the first sidelink wireless communication device, a time slot, which is X slots prior to the sidelink grant, as the resource in a time-domain, wherein X is configured by a wireless communication node in a layer higher than a MAC layer.

FIG. 6 is a flow diagram depicting a method for reference signaling design and configuration, in accordance with some embodiments of the present disclosure. Additional, fewer, or different operations may be performed in the method depending on the particular embodiment. In some embodiments, some or all operations of method 600 may be performed by a wireless communication node, such as BS 102 in FIG. 1B. In some operations, some or all operations of method 600 may be performed by a wireless communication device, such as UE 104a in FIG. 1B. In some operations, some or all operations of method 600 may be performed by a wireless communication device, such as UE 104b in FIG. 1B. Each operation may be re-ordered, added, removed, or repeated.

As shown, the method 600 includes the operation 602 of randomly selecting, by the first sidelink wireless communication device from a resource pool, a sub-channel as the resource in a frequency-domain. The method 600 includes the operation of 604 of selecting, by the first sidelink wireless communication device, a time slot, which is X slots prior to the sidelink grant, as the resource in a time-domain, wherein X is configured in a layer higher than a MAC layer.

FIG. 7 is a flow diagram depicting a method for reference signaling design and configuration, in accordance with some embodiments of the present disclosure. Additional, fewer, or different operations may be performed in the method depending on the particular embodiment. In some embodiments, some or all operations of method 700 may be performed by a wireless communication node, such as BS 102 in FIG. 1B. In some operations, some or all operations of method 700 may be performed by a wireless communication device, such as UE 104a in FIG. 1B. In some operations, some or all operations of method 700 may be performed by a wireless communication device, such as UE 104b in FIG. 1B. Each operation may be re-ordered, added, removed, or repeated.

As shown, the method 700 includes the operation 702 of determining, by a first sidelink wireless communication device, that a sidelink grant has been configured for transmitting a medium access control (MAC) protocol data unit (PDU). The method 700 includes the operation of 704 of reserving, by the first sidelink wireless communication device based on the MAC PDU, a resource to transmit a stand-alone sidelink control information (SCI) to a second sidelink wireless communication device.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A wireless communication method, comprising:
    receiving, by a first wireless communication device from a wireless communication node comprising a network base station, configuration information of a sidelink medium access control (MAC) control element (CE), wherein the configuration information of the sidelink MAC CE comprises a first indicator configured to identify which scheduling request configuration is applicable for the sidelink MAC CE; and
    triggering, by the first wireless communication device according to the configuration information, a scheduling request (SR) corresponding to the sidelink MAC CE.

2. The wireless communication method of claim 1, wherein the sidelink MAC CE comprises a channel status information (CSI) report.

3. The wireless communication method of claim 1, wherein the sidelink MAC CE further comprises a rank indicator (RI) report.

4. A wireless communication method, comprising:
    transmitting, by a wireless communication node comprising a network base station, to a first wireless communication device, configuration information of a sidelink medium access control (MAC) control element (CE), wherein the configuration information of the sidelink MAC CE comprises a first indicator configured to identify which scheduling request configuration is applicable for the sidelink MAC CE; and
    wherein the first wireless communication device triggers, according to the configuration information, a scheduling request (SR) corresponding to the sidelink MAC CE.

5. The wireless communication method of claim 4, wherein the sidelink MAC CE comprises a channel status information (CSI) report.

6. The wireless communication method of claim 4, wherein the sidelink MAC CE further comprises a rank indicator (RI) report.

7. A first wireless communication device, comprising:
    at least one processor configured to:
        receive, via a transceiver from a wireless communication node comprising a network base station, configuration information of a sidelink medium access control (MAC) control element (CE), wherein the configuration information of the sidelink MAC CE comprises a first indicator configured to identify which scheduling request configuration is applicable for the sidelink MAC CE; and
        trigger, via the transceiver according to the configuration information, a scheduling request (SR) corresponding to the sidelink MAC CE.

8. The first wireless communication device of claim 7, wherein the sidelink MAC CE comprises a channel status information (CSI) report.

9. The first wireless communication device of claim 7, wherein the sidelink MAC CE further comprises a rank indicator (RI) report.

10. A wireless communication node comprising a network base station, comprising:
    at least one processor configured to:
        transmitting, via a transmitter to a first wireless communication device, configuration information of a sidelink medium access control (MAC) control element (CE), wherein the configuration information of the sidelink MAC CE comprises a first indicator configured to identify which scheduling request configuration is applicable for the sidelink MAC CE; and
        wherein the first wireless communication device triggers, according to the configuration information, a scheduling request (SR) corresponding to the sidelink MAC CE.

11. The wireless communication node of claim 10, wherein the sidelink MAC CE comprises a channel status information (CSI) report.

12. The wireless communication node of claim 10, wherein the sidelink MAC CE further comprises a rank indicator (RI) report.

* * * * *